United States Patent [19]

Eicke

[11] 4,009,992

[45] Mar. 1, 1977

[54] INSTALLATION AND METHOD FOR MANUFACTURING CEMENT

[75] Inventor: Gerd Eicke, Kaarst, Germany

[73] Assignee: Loesche Hartzerkleinerungs -und Zementmachinen KG, Dusseldorf, Germany

[22] Filed: Nov. 20, 1974

[21] Appl. No.: 525,634

[30] Foreign Application Priority Data

Dec. 7, 1973 Germany .......................... 2361060

[52] U.S. Cl. .............................. 432/106; 106/103; 432/80; 432/85; 432/103

[51] Int. Cl.² .......................... F27B 7/20; F27B 7/38

[58] Field of Search ............... 432/103, 78, 79, 80, 432/81, 85, 106; 106/103; 34/12

[56] References Cited

UNITED STATES PATENTS

| | | | |
|---|---|---|---|
| 1,468,168 | 9/1923 | Pike | 432/106 |
| 2,863,726 | 12/1958 | Kamlet | 106/103 |
| 3,159,386 | 12/1964 | Reaney et al. | 432/106 |
| 3,442,498 | 5/1969 | Davis | 106/103 |
| 3,811,823 | 5/1974 | Warshawsky | 432/103 |
| 3,824,068 | 7/1974 | Kobayashi et al. | 437/80 |
| 3,839,803 | 10/1974 | Dick | 432/78 |
| 3,840,334 | 10/1974 | Chielens | 432/80 |

Primary Examiner—John J. Camby
Attorney, Agent, or Firm—Holman & Stern

[57] ABSTRACT

The specification describes an installation for producing cement in which a mixture of limestone and clay minerals is ground to raw flour and the raw flour is calcined in a rotary kiln with the supply of heat and is kilned to form clinker. Downstream from the rotary kiln an air flow mill is arranged, to which the clinker from the rotary kiln is passed. It has a fresh air supply duct for cooling the clinker during the grinding operation and the outlet for material to be ground is connected with the cement flour bunker with the use for this purpose of a filter and a blower.

5 Claims, 1 Drawing Figure

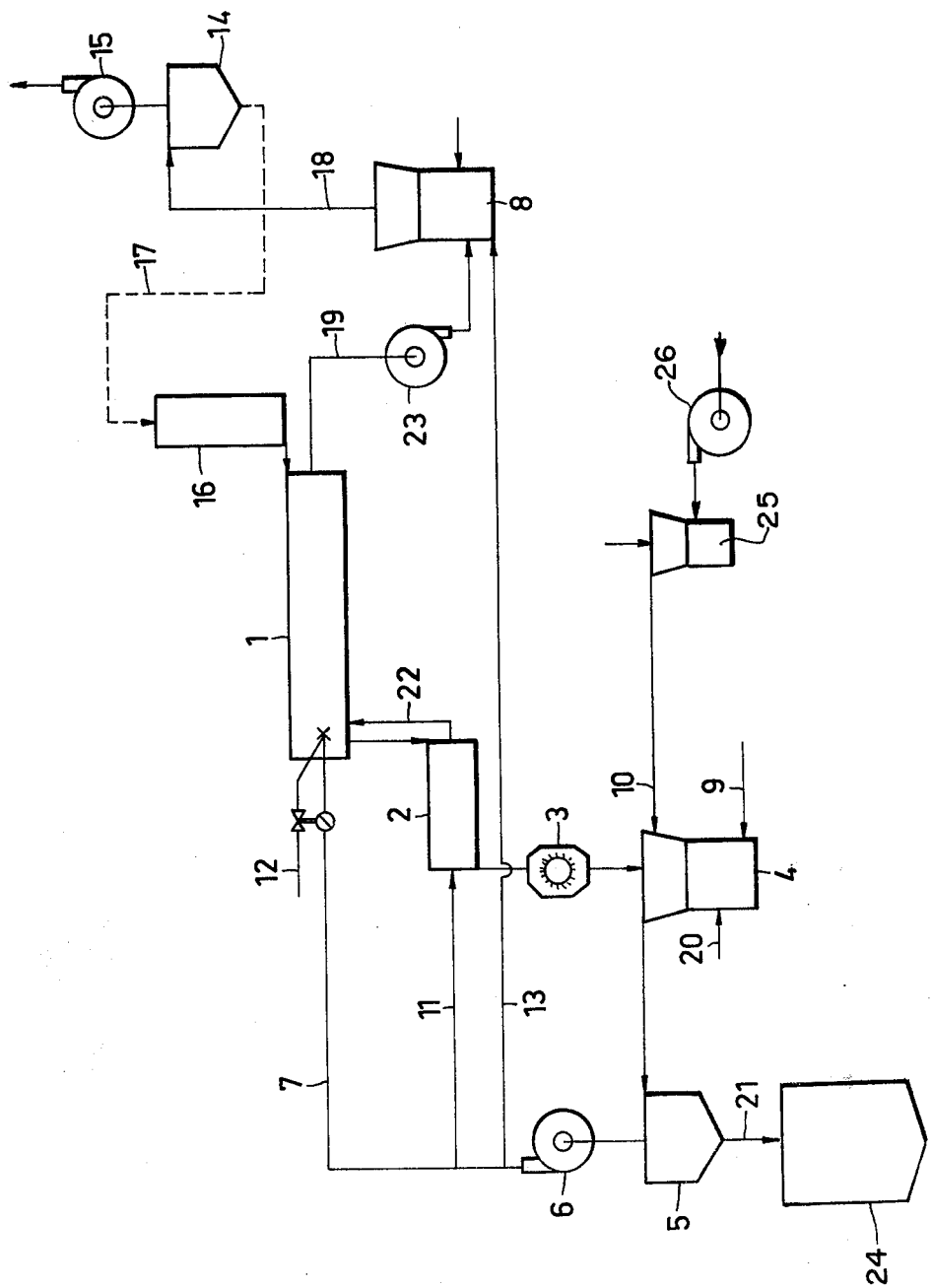

INSTALLATION AND METHOD FOR MANUFACTURING CEMENT

BACKGROUND OF INVENTION

1. Field to which Invention Relates

The invention relates to an installation and a method for producing cement in which a mixture of limestone and clay minerals are ground to form raw flour and the latter is calcined in a rotary kiln with the necessary supply of heat and fired to form clinker.

2. The Prior Art

In the case of prior art methods, the clinker produced has a temperature of approximately 1400° C and must be cooled in coolers to temperature of 80 to 250° C. This cooling requirement leads to an interruption of the production process because the clinker must be transferred from the rotary kiln to a clinker store for cooling. After this interruption the clinker can be ground in a mill with the addition of gypsum and other materials to form cement. The grinding is generally carried out in a cement tube mill.

For clinker cooling use is made of planetary coolers, tube coolers, shaft coolers or grate coolers. However, all clinker coolers have the disadvantage that, owing to the poor heat transfer from the lump clinker, very large amounts of cold air are necessary. If insufficient quantities of air for cooling are provided, the clinker is insufficiently cooled.

In the case of one application of planetary coolers, tube coolers or shaft coolers the quantity of cooling air is adapted to suit the air requirement of the rotary kiln. However, the clinker still remains too hot. As a result it must be subsequently cooled during intermediate storage and in the clinker grinding installation. The waste heat of the cooling air cannot usually be made use of.

In the case of grate coolers a quantity of cooling air is used which exceeds the requirement of the rotary kiln so that, although the clinker is cooled to a greater degree, the excessive cooling air must be separately freed of dust. There is also an attendant loss of heat.

The necessity, in the case, for the known methods of cooling the lump clinker material and the subsequent sacrifice as regards the interruption of production is a substantial economic disadvantage.

It had not been gathered that it is appropriate to comminute the clinker material for the cooling operation in order in this manner to increase the surface area for heat exchange.

SUMMARY OF INVENTION

One aim of the present invention is to reduce the amount of cold air required with known clinker cooling. Another object is to overcome the necessity for interrupting production caused by the need to transport the clinker from the rotary kiln to a clinker store before it is possible to continue production using clinker from the store.

It has been discovered that in the case of the prior art method large quantities of cooling air are necessary because the lump clinker material, owing to its comparatively small surface in relation to its volume, releases its heat very slowly. It has been found that in the case of cooling clinker a very much greater efficiency can be achieved if the cold air is allowed to act on the clinker while it is being ground to produce the clinker flour. It has furthermore been found that conventional air current mills are particularly suitable for economic heat exchange because, in the case of such mills, the material to be ground is in a broken-up condition, which is produced by the carrying or suspending air. Suitable air current mills are described for example in the German Patent Specifications Nos. 871,870, 818,721, and 1,152,297.

For carrying out the method it is necessary to arrange the individual unit in the installation for the production of cement differently from the arrangement in known installations and to provide an air flow mill for grinding up the clinker.

The installation for the production of cement is similar to known installations insofar as use is also made of a raw flour grinding installation, from which the raw flour is supplied to a rotary kiln. In accordance with the invention, a conventional air flow mill is arranged downstream from the rotary kiln to which the clinker from the rotary kiln is supplied and which has a fresh air supply by means of a fan for cooling the clinker during the milling operation. The ground cement is separated in a filter from the air flow and supplied to a cement flour bunker. The cooling action within the air flow mill can be improved still further by connecting the air flow mill with a water supply, by means of which water can be sprayed into the air flow mill. In accordance with the specific type of starting material it may be convenient to arrange a preliminary breakage between the rotary kiln and the air flow mill, so that preliminary comminution can take place in the breaker.

In accordance with the invention, a filter for dust removal from the air flow mill waste gases is arranged between the air flow mill and the cement bunker. This filter can be connected with the rotary kiln for the purpose of supply of combustion air and can be connected with the raw flour mill for the purpose of supply of hot air. The air flow mill can furthermore have a supply duct for the supply of gypsum. Also a separate gypsum mill can be provided from which the gypsum flour is blown in at a position downstream from the air flow mill.

The installation, in accordance with the invention, offers the opportunity of carrying out a method in the case of which the clinker supplied from the rotary kiln is cooled during milling by cold air or air direct from the atmosphere, and by using additional injection or spraying of water during milling the cooling operation can be still further improved.

By using a substantial increase in the surface area of the clinker, which is due to milling, it is possible to achieve a substantial improvement in the heat transfer from the clinker flour to the cooling air. The consequence of this is that the reduced cooling air quantity does not exceed the air requirement of the rotary kiln. As a result it is not necessary to use additional cooling devices with the concomitant dust removing means necessary. Also there is the advantage that it is possible to dispense with an intermediate store for the clinker material so that there is a reduction in expenses for machinery and building construction and also there is a saving in the amount of land required.

DESCRIPTION OF PREFFERED EMBODIMENTS

In the accompanying sketch the arrangement of the installation in accordance with the invention is shown diagrammatically.

The raw material for cement production is firstly passed to the raw flour milling installation 8. From the latter the flour passes through the duct 18 to the filter 14 which is coupled with a waste gas blower 15. The direction of the waste gases is indicated by an arrow. The raw flour then passes via a supply duct 17 to the raw flour bunker 16. From the bunker 16 the rotary kiln 1 is supplied. The heating of the rotary kiln with primary air is carried out through a duct 7, which in the rotary kiln 1 joins the fuel supply duct 12. The kilned klinker is drawn off at the left-hand end of the rotary kiln 1 and passes to a preliminary cooler 2, which via the duct 11 is supplied with secondary air. The preliminary cooler 2 is furthermore connected with the rotary kiln 1 by ducts 22 which make possible an air exchange. From the preliminary cooler 2 the clinker passes to a preliminary breaker 3, which however may in certain cases be dispensed with. From the preliminary breaker 3 the preliminarily comminuted clinker passes to the air flow mill 4, which possesses a fresh air supply 9 and a water supply 20. Furthermore, a gypsum supply means 10 is provided, receiving gypsum from a gypsum mill 25 having a blower 26. In the preliminary cooler 2 the clinker, which has a temperature of about 1400° C, is precooled with the waste gases, having a temperature of approximately 80° C, from the air flow mill 4 to a temperature of approximately 500° C. In the air flow mill, during the grinding to make cement, the fresh air current in the mill ensures a cooling of the cement flour to 60° to 100° C. The cement flour then passes at this temperature into a filter 5 where it is separated from the air current and it passes through the duct 21 into the cement flour bunker 24. The filter 5 is coupled with a blower 6, which via the duct 13 supplies the raw flour mill 8 with waste gas and furthermore supplies via the duct 11 the secondary air for the precooler 2 and supplies the primary air through the duct 7 for the combustion for heating the rotary kiln 1. A duct 19 leads from the rotary furnace 1 via a blower 23 to the raw flour mill 8.

In the present specification and claims the expression "limestone" is to be taken to include equivalent materials as for example chalk.

I claim:

1. In an installation for producing cement including first milling means for grinding a mixture of limestone and clay minerals to raw flour, means for calcining and firing said raw flour in a rotary kiln to form clinker, means for cooling said clinker, means for grinding said clinker to cement flour and means for storing said cement flour, the improvement comprising means downstream of said rotary kiln for substantially simultaneously cooling and grinding said clinker to cement flour, said cooling and grinding means including means for receiving said clinker, second milling means for grinding said clinker, and duct means communicating with said second milling means for supplying fresh air thereto for cooling said clinker during milling, and further comprising filter means interposed between said simultaneous cooling and grinding means and said cement flour storage means for separating said cement flour from said cooling air.

2. An installation in accordance with claim 1, characterized in that said simultaneous cooling and griding means further includes a water supply means communicating therewith, whereby, water can be injected thereinto.

3. An installation in accordance with claim 1, including a blower associated with said filter, said blower connected with the rotary kiln for supplying combustion air thereto and connected with the raw flour mill for the purpose of supplying hot air thereto.

4. An installation in accordance with claim 1, wherein a solid material supply duct communicating therewith whereby gypsum may be supplied thereto.

5. An installation in accordance with claim 1, including a separate gypsum mill from which gypsum flour is injected at a point downstream from the cooling and grinding means.

* * * * *